(12) United States Patent
Zhao et al.

(10) Patent No.: US 10,968,803 B2
(45) Date of Patent: *Apr. 6, 2021

(54) SYSTEMS AND METHODS FOR IDLE FUEL ECONOMY MODE

(71) Applicant: Cummins Inc., Columbus, IN (US)

(72) Inventors: Minming Zhao, Columbus, IN (US); Josh Si Shao, Columbus, IN (US); Sriram Madhavan, Columbus, IN (US); Matthew John Zanker, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/550,501

(22) Filed: Aug. 26, 2019

(65) Prior Publication Data

US 2019/0376428 A1 Dec. 12, 2019

Related U.S. Application Data

(63) Continuation of application No. 15/294,347, filed on Oct. 14, 2016, now Pat. No. 10,392,990.

(51) Int. Cl.
*F01N 3/20* (2006.01)
*F01N 9/00* (2006.01)
*F01N 11/00* (2006.01)
*F02D 41/08* (2006.01)

(52) U.S. Cl.
CPC ........... *F01N 3/208* (2013.01); *F01N 3/2066* (2013.01); *F01N 9/005* (2013.01); *F01N 11/00* (2013.01); *F01N 2550/02* (2013.01); *F01N 2560/026* (2013.01); *F01N 2610/02* (2013.01); *F01N 2900/0422* (2013.01); *F01N 2900/1602* (2013.01); *F01N 2900/1622* (2013.01); *F01N 2900/1814* (2013.01); *F02D 41/08* (2013.01); *Y02T 10/12* (2013.01); *Y02T 10/40* (2013.01)

(58) Field of Classification Search
CPC ........ F01N 3/2066; F01N 3/208; F01N 9/005; F01N 2550/02; F01N 2560/026; F01N 2610/02; F01N 2900/0422; F01N 2900/1602; F01N 2900/1622; F02D 41/08
See application file for complete search history.

(56) References Cited

U.S. PATENT DOCUMENTS

| | | |
|---|---|---|
| 8,397,489 B2 | 3/2013 | Webb et al. |
| 8,862,370 B2 | 10/2014 | Theis et al. |
| 2004/0098974 A1 | 5/2004 | Nieuwstadt et al. |
| 2010/0058738 A1 | 3/2010 | Webb et al. |
| 2011/0061370 A1 | 3/2011 | Aoyama et al. |
| 2013/0227933 A1 | 9/2013 | O'Neil et al. |
| 2015/0013309 A1 | 1/2015 | Upadhyay et al. |
| 2015/0033705 A1 | 2/2015 | Anilovich et al. |

*Primary Examiner* — Audrey K Bradley
(74) *Attorney, Agent, or Firm* — Foley & Lardner LLP (57) ABSTRACT

An apparatus includes a stored reductant determination circuit structured to determine an amount of stored reductant in a component of an exhaust aftertreatment system, and a fuel mode economy circuit structured to control an amount of reductant added to the exhaust aftertreatment system during an engine idle mode of operation based on the amount of stored reductant.

20 Claims, 3 Drawing Sheets

SYSTEMS AND METHODS FOR IDLE FUEL ECONOMY MODE

CROSS-REFERENCE TO RELATED APPLICATIONS

This application is a continuation of U.S. patent application Ser. No. 15/294,347 filed Oct. 14, 2016, which is incorporated herein by reference in its entirety.

TECHNICAL FIELD

The present disclosure relates to exhaust aftertreatment systems. More particularly, the present disclosure relates to operating an in-use selective catalytic reduction and ammonia oxidation system, and an exhaust gas recirculation system of an exhaust aftertreatment system.

BACKGROUND

Emission regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set acceptable emission standards, to which all engines must comply. For example, the California Air Board (CAB) dictates a nitrogen oxide (NOx) emission standard (e.g., 30 grams NOx per hour). Consequently, using exhaust aftertreatment systems to reduce engine emissions is desirable.

Exhaust aftertreatment systems can include exhaust gas recirculation (EGR) systems that recirculate exhaust gases to an intake manifold of an engine. Additionally, exhaust aftertreatment systems can include reductant dosing systems that introduce a reductant (e.g., urea, diesel exhaust fluid (DEF), ammonia solutions, etc.) to reduce the NOx that passes through a catalyst chamber of the aftertreatment system.

SUMMARY

One embodiment relates to an apparatus that includes a stored reductant determination circuit and a fuel mode economy circuit. The stored reductant determination circuit is structured to determine an amount of stored reductant in a component of an exhaust aftertreatment system. The fuel mode economy circuit is structured to control an amount of reductant added to the exhaust aftertreatment system during an engine idle mode of operation based on the amount of stored reductant.

Another embodiment relates to a system that includes an exhaust aftertreatment system and a controller in communication with the exhaust aftertreatment system. The exhaust aftertreatment system including a reductant source and a selective catalytic reduction (SCR) component. The controller is structured to determine an amount of stored reductant in the SCR component of the exhaust aftertreatment system, and control an amount of reductant added to the exhaust aftertreatment system during an engine idle mode of operation based on the amount of stored reductant.

Another embodiment relates to a method. The method includes detecting a level of nitrogen oxide present in a flow of exhaust gas downstream of a catalyst during an engine idle mode of operation, comparing the detected level of nitrogen oxide to a threshold, inhibiting a flow of reductant to the catalyst when the nitrogen oxide level is below the threshold, and providing reductant to the catalyst when the nitrogen oxide level is above the threshold.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of, methods, apparatuses, and systems for operating an engine in a fuel efficient idle mode. The various concepts introduced above and discussed in greater detail below may be implemented in any number of ways, as the concepts described are not limited to any particular manner of implementation. Examples of specific implementations and applications are provided primarily for illustrative purposes.

Referring the Figures generally, the various embodiments disclosed herein relate to systems, apparatuses, and methods for operating an engine in a fuel efficient idle mode based on an amount of reductant stored in the system. The system includes a controller and an exhaust gas aftertreatment system that includes a selective catalytic reduction (SCR) system structured to introduce or dose a reductant into an exhaust gas stream, and an exhaust gas recirculation (EGR) system. The controller is structured to identify when a level of ammonia in the SCR system is adequate to control nitrogen oxide (NOx) emissions from the exhaust gas aftertreatment system to be below an emission threshold without having to add additional reductant or without having to use EGR. If the level of ammonia is adequate to limit emissions below a desired level, the controller is structured to operate the engine according to the fuel efficient idle mode while adding substantially zero reductant to the exhaust gas stream. The controller continually monitors NOx emissions and other factors to determine when reductant dosing and/or EGR are needed and exits the fuel efficient idle mode when predetermined conditions are met. By operating in the fuel efficient idle mode, the engine realizes substantial fuel savings while still meeting all required emissions standards.

Figure 1:
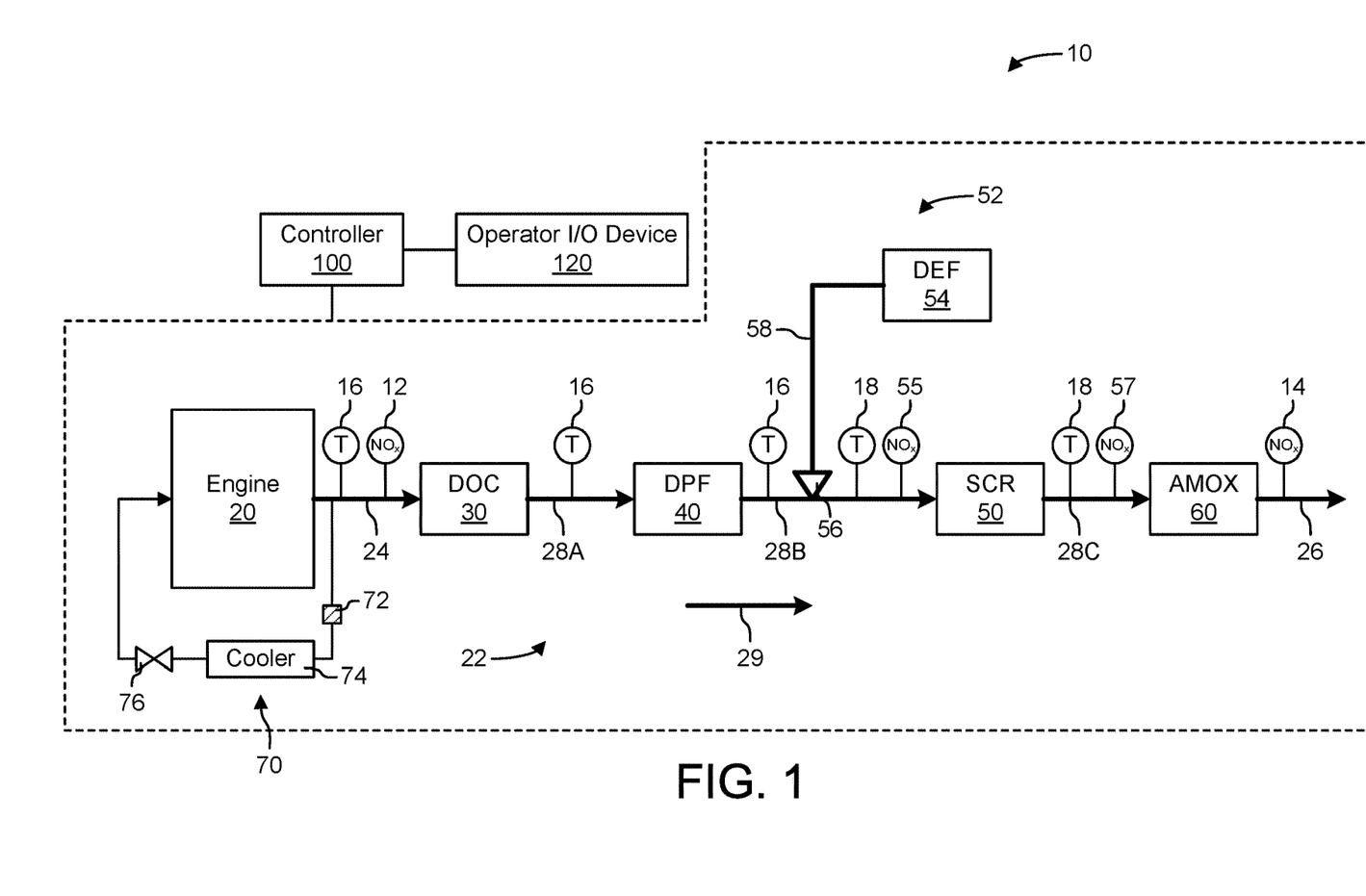
FIG. 1 is schematic diagram of an exhaust aftertreatment system with a controller, according to an example embodiment.

As shown in FIG. 1, a schematic diagram of an exhaust aftertreatment system with a controller 100 is shown according to an example embodiment. The engine-exhaust aftertreatment system is shown in the form of an engine system 10 that includes an internal combustion engine 20 and an exhaust aftertreatment system 22 in exhaust gas-receiving communication with the engine 20. According to one embodiment, the engine 20 is structured as a compression-ignition internal combustion engine that utilizes diesel fuel. In various other embodiments, the engine 20 may be structured as any other type of engine (e.g., spark-ignition, electric) that utilizes any type of fuel (e.g., gasoline, electricity, hydrogen). Within the internal combustion engine 20, air from the atmosphere is combined with fuel and combusted to power the engine. Combustion of the fuel and air in the compression chambers of the engine 20 produces exhaust gas that is operatively vented to an exhaust manifold (not shown) and to the aftertreatment system 22.

The exhaust aftertreatment system 22 includes a diesel particular filter (DPF) 40, a diesel oxidation catalyst (DOC) 30, a selective catalytic reduction (SCR) system 52 with an SCR catalyst 50, an ammonia oxidation (AMOx) catalyst 60, and an exhaust gas recirculation (EGR) system 70. The SCR system 52 further includes a reductant delivery system that has a diesel exhaust fluid (DEF) source 54 that supplies DEF to a DEF doser 56 via a DEF line 58.

In an exhaust flow direction, as indicated by directional arrow 29, exhaust gas flows from the engine 20 into inlet piping 24 of the exhaust aftertreatment system 22. From the inlet piping 24, the exhaust gas flows into the DOC 30 and exits the DOC into a first section of exhaust piping 28A. From the first section of exhaust piping 28A, the exhaust gas flows into the DPF 40 and exits the DPF into a second section of exhaust piping 28B. From the second section of exhaust piping 28B, the exhaust gas flows into the SCR catalyst 50 and exits the SCR catalyst into the third section of exhaust piping 28C. As the exhaust gas flows through the second section of exhaust piping 28B, it is periodically dosed with DEF by the DEF doser 56. Accordingly, the second section of exhaust piping 28B acts as a decomposition chamber or tube to facilitate the decomposition of the DEF to ammonia. From the third section of exhaust piping 28C, the exhaust gas flows into the AMOx catalyst 60 and exits the AMOx catalyst into outlet piping 26 before the exhaust gas is expelled from the system 22. Based on the foregoing, in the illustrated embodiment, the DOC 30 is positioned upstream of the DPF 40 and the SCR catalyst 50, and the SCR catalyst 50 is positioned downstream of the DPF 40 and upstream of the AMOx catalyst 60. However, in alternative embodiments, other arrangements of the components of the exhaust aftertreatment system 22 are also possible.

The DOC 30 may be structured to have any number of different types of flow-through designs. Generally, the DOC 30 is structured to oxidize at least some particulate matter in the exhaust (e.g., the soluble organic fraction of soot) and reduce unburned hydrocarbons and CO in the exhaust to less environmentally harmful compounds. For example, the DOC 30 may be structured to reduce the hydrocarbon and CO concentrations in the exhaust to meet the requisite emissions standards for those components of the exhaust gas. An indirect consequence of the oxidation capabilities of the DOC 30 is the ability of the DOC to oxidize NO into $NO_2$. In this manner, the level of $NO_2$ exiting the DOC 30 is equal to the $NO_2$ in the exhaust gas generated by the engine 20 in addition to the $NO_2$ converted from NO by the DOC.

In addition to treating the hydrocarbon and CO concentrations in the exhaust gas, the DOC 30 may also be used in the controlled regeneration of the DPF 40, SCR catalyst 50, and AMOx catalyst 60. This can be accomplished through the injection, or dosing, of unburned HC into the exhaust gas upstream of the DOC 30. Upon contact with the DOC 30, the unburned HC undergoes an exothermic oxidation reaction which leads to an increase in the temperature of the exhaust gas exiting the DOC 30 and subsequently entering the DPF 40, SCR catalyst 50, and/or the AMOx catalyst 60. The amount of unburned HC added to the exhaust gas is selected to achieve the desired temperature increase or target controlled regeneration temperature.

The DPF 40 may be any of various flow-through designs, and is structured to reduce particulate matter concentrations (e.g., soot and ash) in the exhaust gas to meet requisite emission standards. The DPF 40 captures particulate matter and other constituents, and thus can be periodically regenerated to burn off the captured constituents. Additionally, the DPF 40 may be structured to oxidize NO to form $NO_2$ independent of the DOC 30.

As discussed above, the SCR system 52 includes a reductant delivery system with a reductant (e.g., DEF) source 54, pump (not shown), and delivery mechanism or doser 56. The reductant source 54 can be a container or tank capable of retaining a reductant, such as, for example, ammonia ($NH_3$), DEF (e.g., urea), or diesel oil. The reductant source 54 is in reductant supplying communication with the pump, which is structured to pump reductant from the reductant source 54 to the delivery mechanism 56 via a reductant delivery line 58. The delivery mechanism 56 is positioned upstream of the SCR catalyst 50. The delivery mechanism 56 is selectively controllable to inject reductant directly into the exhaust gas stream prior to entering the SCR catalyst 50. As described herein, the controller 100 is structured to control the timing and amount of the reductant delivered to the exhaust gas. In some embodiments, the reductant may either be ammonia or DEF, either of which decomposes to produce ammonia. As briefly described above, the ammonia reacts with NOx in the presence of the SCR catalyst 50 to reduce the NOx to less harmful emissions, such as $N_2$ and $H_2O$. The NOx in the exhaust gas stream includes $NO_2$ and NO. Generally, both $NO_2$ and NO are reduced to $N_2$ and $H_2O$ through various chemical reactions driven by the catalytic elements of the SCR catalyst in the presence of $NH_3$.

The SCR catalyst 50 may be any of various catalysts known in the art. For example, in some implementations, the SCR catalyst 50 is a vanadium-based catalyst, and in other implementations, the SCR catalyst is a zeolite-based catalyst, such as a Cu-Zeolite or a Fe-Zeolite catalyst. In one representative embodiment, the reductant is aqueous urea and the SCR catalyst 50 is a zeolite-based catalyst. In other embodiments, the reductant includes a first reductant and a second reductant, wherein the first reductant is urea and the second reductant is ammonia.

Figure 2:
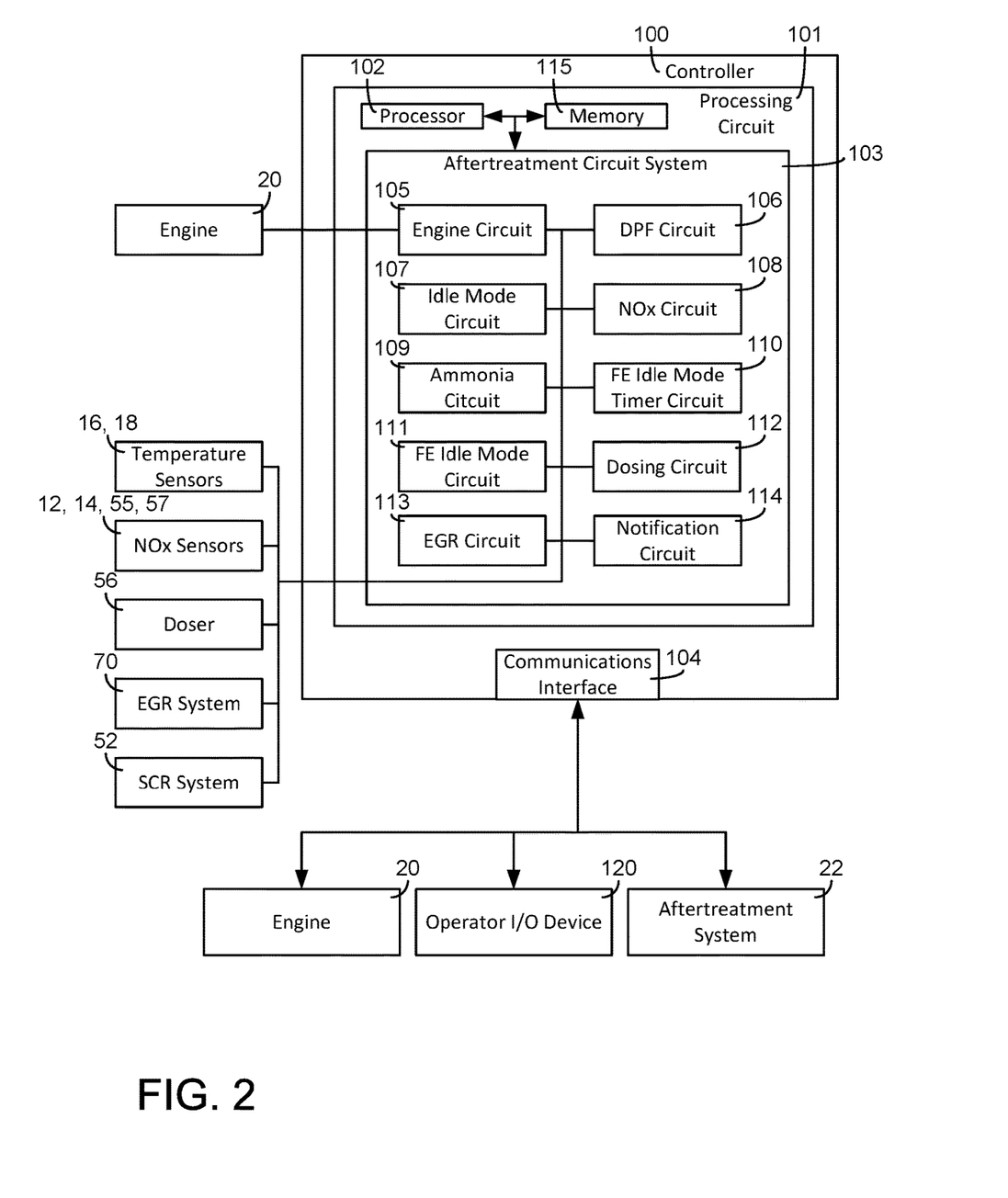
FIG. 2 is a schematic of the controller used with the system of FIG. 1, according to an example embodiment.

The AMOx catalyst 60 may be any of various flow-through catalysts structured to react with ammonia to produce mainly nitrogen. As briefly described above, the AMOx catalyst 60 is structured to remove ammonia that has slipped through or exited the SCR catalyst 50 without reacting with $NO_x$ in the exhaust. In certain instances, the aftertreatment system 22 can be operable with or without an AMOx catalyst. Further, although the AMOx catalyst 60 is shown as a separate unit from the SCR system 52 in FIGS. 1-2, in some implementations, the AMOx catalyst may be integrated with the SCR catalyst (e.g., the AMOx catalyst and the SCR catalyst can be located within the same housing). In some embodiments, the SCR catalyst and AMOx catalyst are positioned serially with the SCR catalyst preceding the AMOx catalyst as shown in FIG. 2.

As referred to herein, the SCR catalyst 50 and AMOx catalyst 60 form the SCR and AMOx system. Accordingly, health or degradations determined are in regard to those catalysts.

Various sensors, such as NOx sensors 12, 14, 55, 57 and temperature sensors 16, 18, may be strategically disposed throughout the exhaust aftertreatment system 22 and may be in communication with the controller 100 and structured to monitor operating conditions of the engine system 10. As shown, more than one NOx sensor may be positioned upstream and downstream of the SCR catalyst 50. In this configuration, the NOx sensor 12 measures the engine out NOx while NOx sensor 55 measures the SCR catalyst 50 inlet NOx amount. This is due to DOC 30/DPF 40 potentially oxidizing some portion of the engine out NOx whereby the engine out NOx amount would not be equal to the SCR catalyst 50 inlet NOx amount. Accordingly, this configuration accounts for this potential discrepancy. The NOx amount leaving the SCR catalyst 50 may be measured by NOx sensor 57 and/or NOx sensor 14. In some embodiments, there may be only one such sensor, such as either one of either NOx sensor 57 or NOx sensor 14. The NOx sensor 57 (in some embodiments, NOx sensor 14) is positioned downstream of the SCR catalyst 50 and structured to detect the concentration of NOx in the exhaust gas downstream of the SCR catalyst (e.g., exiting the SCR catalyst).

The temperature sensors 16 are associated with the DOC 30 and DPF 40, and thus can be defined as DOC/DPF temperature sensors 16. The DOC/DPF temperature sensors are strategically positioned to detect the temperature of exhaust gas flowing into the DOC 30, out of the DOC and into the DPF 40, and out of the DPF before being dosed with DEF by the doser 56. The temperature sensors 18 are associated with the SCR catalyst 50 and thus can be defined as SCR temperature sensors 18. The SCR temperature sensors 18 are strategically positioned to detect the temperature of exhaust gas flowing into and out of the SCR catalyst 50.

The EGR system 70 is structured to recirculate exhaust gas back to an intake manifold of the engine 20 to be re-used for combustion. By routing exhaust gas back to the engine 20 for combustion, inert gases are provided for combustion and function to absorb combustion heat to reduce peak in-cylinder temperatures. Advantageously, this function works to reduce nitrous oxide (NOx) emissions from the engine 20. As shown, the EGR system 70 includes an EGR orifice 72, an EGR cooler 74, and an EGR valve 76. It should be understood that this diagram is an example only and not meant to be limiting as many other components may be added or excluded from the EGR system 70 (as well as the engine system 10 in general). For example, the EGR orifice 72 is an optional component as is the EGR cooler 74, as some configurations may not include these components. The EGR valve 76 is selectively activated by the controller 100 and includes any type of valve typically included with EGR systems. When the EGR valve 76 is fully closed, exhaust gas is inhibited from recirculating back to the intake manifold 21. When the EGR valve 76 is fully or partially open, exhaust gas is permitted to recirculate back to the intake manifold 21. The EGR orifice 72 is structured as any type of EGR orifice typically included in EGR systems. The EGR orifice 72 is situated between an exhaust manifold of the engine 20 and the EGR valve 76. Due to this positioning, a pressure drop is formed across the EGR orifice 72 whenever exhaust gas is recirculated to the intake manifold (e.g., the EGR valve 76 is open or partially open). Temperature sensors, pressure sensors, and/or flow sensors may be positioned proximate the EGR orifice 72 and may be communicably coupled to the controller 100 and structured to acquire and provide data indicative of a temperature, pressure, and flow of exhaust gas flowing through the EGR orifice 72 in the EGR system 70 toward the intake manifold.

As mentioned above, the EGR system 70 includes an EGR cooler 74 and an EGR valve 76. The EGR cooler 74 is structured as any type of heat exchanger typically included in EGR systems including, but not limited to, air-to-air and/or liquid (e.g., coolant)-to-air (e.g., exhaust gas) heat exchangers. The EGR cooler 74 is structured to remove heat from the exhaust gas prior to the exhaust gas being re-introduced into the intake manifold. Heat is removed from the exhaust gas prior to reintroduction to, among other reasons, prevent high intake temperatures that could promote pre-ignition (e.g., engine knock). Additional temperature sensors, pressure sensors, and/or flow sensors may be positioned after the EGR valve 76 proximate a charge air stream. Accordingly, data indicative of the temperature, pressure, and flow of the exhaust gas entering the charge air stream (and, consequently, the intake manifold) can be communicated to the controller 100. Moreover, data indicative of the temperature drop as measured by temperature sensors upstream and downstream of the EGR cooler 74 may be determined and/or approximated.

Although the exhaust aftertreatment system 22 shown includes one of a DOC 30, DPF 40, SCR catalyst 50, and AMOx catalyst 60 positioned in specific locations relative to each other along the exhaust flow path, in other embodiments the exhaust aftertreatment system may include more than one of any of the various catalysts positioned in any of various positions relative to each other along the exhaust flow path. Additionally, although the DOC 30 and AMOx catalyst 60 are non-selective catalysts, in some embodiments, the DOC and AMOx catalyst can be selective catalysts. Further, the EGR system 70 may include other flow paths, or components not described above.

FIG. 1 is also shown to include an operator input/output (I/O) device 120. The operator I/O device 120 is communicably coupled to the controller 100, such that information may be exchanged between the controller 100 and the I/O device 120. The information exchanged between the controller 100 and the I/O device 120 may relate to one or more components of FIG. 1 or any of the determinations of the controller 100 disclosed herein. The operator I/O device 120 enables an operator of the vehicle (or an occupant of the vehicle) to communicate with the controller 100 and other components of the vehicle, such as those illustrated in FIG. 1. For example, the operator input/output device 120 may include an interactive display, a touchscreen device, one or more buttons and switches, voice command receivers, etc. The controller 100 may provide a fault notification (e.g., via the I/O device 120) based on the determined state of the SCR and AMOx system.

The controller 100 is structured to control the operation of the engine system 10 and associated sub-systems, such as the internal combustion engine 20 and the exhaust aftertreatment system 22. According to one embodiment, the components of FIG. 1 are embodied in a vehicle. The vehicle may include an on-road or an off-road vehicle including, but not limited to, line-haul trucks, mid-range trucks (e.g., pick-up trucks), tanks, airplanes, and any other type of vehicle that utilizes an SCR system. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network ("CAN") bus provides the exchange of signals, information, and/or data. The CAN bus includes any number of wired and wireless connections. Because the controller 100 is communicably coupled to the systems and components of FIG. 1, the controller 100 is structured to receive data from one or more of the components shown in FIG. 1. For example, the data may include NOx data (e.g., an incoming NOx amount from NOx sensor 55 and an outgoing NOx amount from NOx sensor 57), dosing data (e.g., timing and amount of dosing delivered from doser 56), and vehicle operating data (e.g., engine speed, vehicle speed, engine temperature, etc.) received via one or more sensors. As another example, the data may include an input from operator input/output device 120. As described more fully herein, using this data, the controller 100 diagnoses and controls the SCR, AMOx, and EGR systems while the SCR, AMOx, and EGR systems are being operated. The structure and function of the controller 100 is further described in regard to FIG. 2.

As shown in FIG. 2, an example structure for the controller 100 includes a processing circuit 101 including a processor 102, a memory 115, and an aftertreatment circuit system 103. The processor 102 may be implemented as a general-purpose processor, an application specific integrated circuit (ASIC), one or more field programmable gate arrays (FPGAs), a digital signal processor (DSP), a group of processing components, or other suitable electronic processing components. The memory 115 (e.g., RAM, ROM, Flash Memory, hard disk storage, etc.) may store data and/or computer code for facilitating the various processes described herein. The memory 115 may be communicably connected to the processor 102 and the aftertreatment circuit system 103 and structured to provide computer code or instructions to the processor 102 for executing the processes described in regard to the controller 100 herein. Moreover, the memory 115 may be or include tangible, non-transient volatile memory or non-volatile memory. Accordingly, the memory 115 may include database components, object code components, script components, or any other type of information structure for supporting the various activities and information structures described herein.

The example controller 100 further includes a communications interface 104 structured to provide communication between the controller 100, the engine 20, the operator input/output device 120, and the aftertreatment system 22. The communications interface 104 may be implemented as a serial bus, a RS232 connection, a wireless router or hub, or another communications interface structure.

The aftertreatment circuit system 103 includes various circuits for completing the activities described herein. More particularly, the aftertreatment circuit system 103 includes circuits structured to operate components of the engine 20 and the aftertreatment system 22. While various circuits with particular functionality are shown in FIG. 2, it should be understood that the controller 100, memory 115, and aftertreatment circuit system 103 may include any number of circuits for completing the functions described herein and that any number of the circuits described may be combined into a single circuit. For example, the activities and functionalities of the circuits of the aftertreatment circuit system 103 may be embodied in the memory 115, or combined in multiple circuits or as a single circuit. Additional circuits with additional functionality may be included. Further, it should be understood that the controller 100 may further control other vehicle activity beyond the scope of the present disclosure.

The aftertreatment circuit system 103 includes an engine circuit 105 structured to control the engine 20, a DPF circuit 106 structured to monitor the operation of the DPF 40, an idle mode circuit 107 structured to operate the engine 20 in a standard idle mode, a NOx circuit 108 in communication with the NOx sensors 12, 14, 55, 57, an ammonia circuit 109 in communication with sensors associated with the SCR catalyst 50 and/or the AMOx catalyst 60, a fuel efficient idle timer circuit 110, a fuel efficient idle mode circuit 111 structured to control a fuel efficient idle mode operation of the engine 20, a dosing circuit 112 structured to control operation of the DEF source 54, an EGR circuit 113 structured to control the EGR system 70, and a notification circuit 114.

The engine circuit 105 is structured to receive information from a user (e.g., via the operator input/output device 120) and to provide instructions to or otherwise control operation parameters of the engine. The DPF circuit 106 is structured to monitor the aftertreatment system 22. For example, the DPF circuit 106 may be structured to monitor and determine if the aftertreatment system 22 is undergoing a regeneration process and to provide instructions that a regeneration process is required. The DPF circuit 106 is in communication with temperature sensors and is structured to monitor the readings of the temperature sensors during the regeneration process. In some embodiments, the DPF circuit 106 can communicate with the engine circuit 105 or other circuits to maintain a desirable regeneration condition during a regeneration process.

The idle mode circuit 107 is structured to communicate with the engine circuit 105 and to operate the engine 20 in the standard idle mode. The standard idle mode may be one of many different idle arrangements including, for example, a CARB clean idle that meets California's Commercial Vehicle Idling Regulations, or any other existing idle strategy. To accomplish the standard idle mode, the idle mode circuit 107 may communicate with other circuits, such as the ammonia circuit 109, the dosing circuit 112, and the EGR circuit 113 to control the aftertreatment system 22. For example, in one embodiment, the idle mode circuit 107 is structured to communicate with the dosing circuit 112 to prevent the dosing circuit 112 from providing any reactant in response a threshold amount of reactant being present in the SCR catalyst 50.

The NOx circuit 108 is structured to communicate with the NOx sensors 12, 14, 55, 57 and provide information regarding NOx levels to the other circuits of the aftertreatment circuit system 103 and to components of the memory 115. The NOx circuit 108 may process raw data received from the NOx sensors 12, 14, 55, 57 in addition to other sensor data to provide information indicative of an NOx level to the other circuits of the aftertreatment circuit system 103 and to components of the memory 115.

In one embodiment, the ammonia circuit 109 is a stored reductant determination circuit that is structured to determine an ammonia storage indication that represents an amount of ammonia stored in the SCR catalyst 50. The ammonia circuit 109 is structured to communicate with the dosing circuit 112, the temperature sensors 16, 18, and the NOx sensors 12, 14, 55, 57 to determine the ammonia storage indication. The ammonia circuit 109 is further structured to determine a nitrogen oxide conversion efficiency of the SCR system 52 based at least in part on the NOx levels and the ammonia storage indication.

The fuel efficient idle timer circuit 110 is structured to record a time or a count in response to directions from one or more circuits of the aftertreatment circuit system 103 or in response to components of the memory 115. In some embodiments, the fuel efficient idle timer circuit 110 triggers the fuel efficient idle mode. In some embodiments, the fuel efficient idle timer circuit 110 includes a separate or additional time comparison circuit for comparing the time value to the time thresholds.

In some embodiments, the fuel efficient idle mode circuit 111 is a type of fuel mode economy circuit and is structured to communicate with the engine circuit 105 and to operate the engine 20 in a fuel efficient idle mode. The fuel efficient idle mode circuit 111 is also structured to communicate with the ammonia circuit 109, the fuel efficient idle timer circuit 110, the dosing circuit 112, and the EGR circuit 113 to operate the fuel efficient idle mode in response to the ammonia storage indication.

The dosing circuit 112 is structured to provide a dosing command that adjusts a reductant dosing amount and a timing of a dosing injection. As such, the dosing command may be provided to a doser, such as doser 56. The dosing circuit 112 may also communicate with the ammonia circuit 109 and the NOx circuit 108, and accumulate dosing data regarding the amount and timing of reductant added to the aftertreatment system 22.

The EGR circuit 113 is structured to communicate with and control the EGR cooler 74 and the EGR valve 76. The EGR circuit 113 is also in communication with the idle mode circuit 107 and the fuel efficient idle mode circuit 111 and structured to control the EGR valve 76 in response to commands from the idle mode circuit 107 and the fuel efficient idle mode circuit 111.

The notification circuit 114 is structured to provide one or more notifications. The notifications may correspond with a fault code, a notification (e.g., on the operator I/O device 120), an idle state or mode, and the like. The notification may indicate the state (e.g., healthy or degraded, active or inactive) for the SCR and AMOx system and the EGR system 70.

In general, the circuits of the aftertreatment circuit system 103 and the components of the memory 115 communicate with the engine system 10 to provide improved idle conditions. More specifically, under predetermined conditions the fuel efficient mode circuit 111 enacts the fuel efficient idle mode and the EGR valve 76 is closed and/or the SCR system 52 is inhibited from dosing reductant while still meeting required NOx output levels (e.g., according to California's Commercial Vehicle Idling Regulations, or any other threshold, standard, or emissions regulation). In one embodiment, the fuel efficient idle mode is enacted based on an SCR bed temperature being above a predetermined SCR bed temperature threshold. In some embodiments, the NOx sensors will not wake or otherwise function properly at too low of a SCR bed temperature. Additionally, at low SCR bed temperatures, the conversion efficiency of the SCR system 52 may be lower than desired. Below, an example method of operating the engine system 10 is discussed with respect to FIG. 3. The method discussed with respect to FIG. 3 makes reference to the controller 100, processor 101, and aftertreatment circuit system 103, though it should be understood that other controllers with alternative structure may be used to implement the processes and methods disclosed herein.

Figure 3:
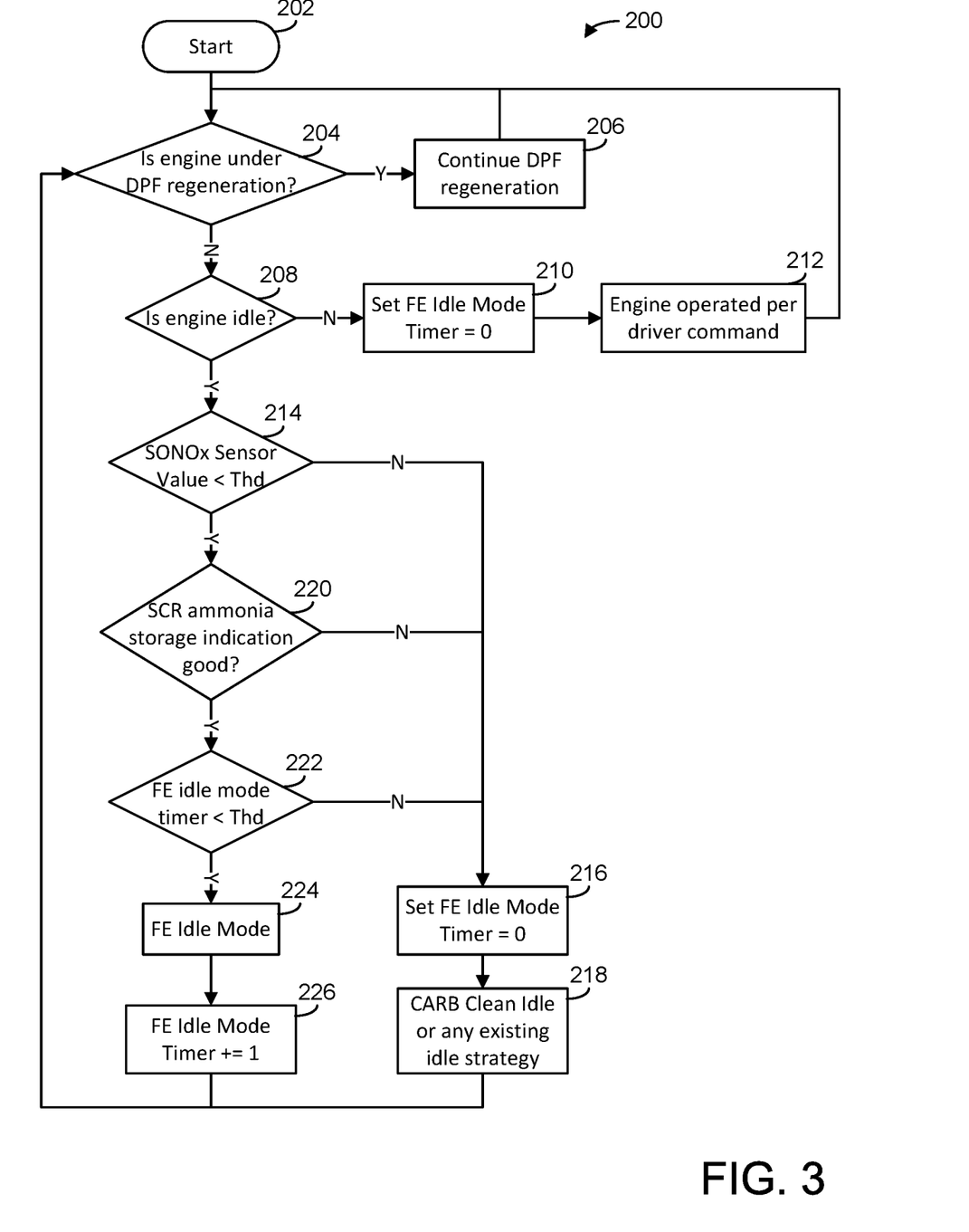
FIG. 3 is a flow diagram of a method of operating an engine system, according to an example embodiment.

Referring now to FIG. 3, a flow diagram of a method 200 of operating an engine system is shown according to an example embodiment. The method 200 is initialized at step 202. For example, the method 200 may be initialized when the engine 20 of the vehicle is started, when a component of the SCR system 52 exceeds a threshold temperature, when a measurement of exhaust gas flowing through the SCR system 52 exceeds a threshold temperature, or in response to another measurement exceeding or falling below a threshold, or anytime that the engine system 10 is powered (e.g., by a battery).

At step 204, the DPF circuit 106 determines if the engine system 10 is operating in a regeneration mode. In one embodiment, if the engine system 10 is undergoing regeneration, then at step 206 the DPF circuit 106 allows the regeneration to continue until the conditions requiring regeneration no longer exist. If the DPF circuit 106 determines at step 204 that the engine is not operating in the regeneration mode and that regeneration is not required, then at step 208 the engine circuit 105 determines if the engine 20 is operating at idle. If the DPF circuit 106 determines that the engine 20 is not operating at idle, then at step 210 the engine circuit 105 communicates with the fuel efficient timer circuit 110 to cause the time value to be set at zero. At step 212, the engine circuit 105 operates the engine 20 according to a user input (e.g., driving, braking, etc.).

At step 208, the engine circuit 105 determines if the engine 20 is operating at idle. At step 214, in response to the engine circuit 105 determining that the engine 20 is operating at idle, the NOx circuit 108 communicates with the NOx sensors 12, 14, 55, 57 and determines a NOx value. The NOx circuit 108 further compares the NOx value to a NOx threshold. In some embodiments, the NOx threshold is predetermined. In one embodiment, the NOx threshold is about thirty grams per hour. In another embodiment, the NOx threshold is about twenty-five grams per hour. In yet another embodiment, the NOx threshold is about twenty grams per hour. However, it will be appreciated that any NOx threshold may be used as the NOx threshold. At step 216, in response to the NOx circuit 108 determining that the NOx value is equal to or greater than the NOx threshold value, the idle mode circuit 107 communicates with the fuel efficient idle timer circuit 110 to set the time value to zero.

After zeroing the time value at step 216, the idle mode circuit 107 directs the engine circuit 105 to operate the engine 20 in the standard idle mode at step 218. When the engine 20 is operated in the standard idle mode, the dosing circuit 112 provides commands to the SCR system 52 to dose reductant from the DEF source 54 into the exhaust stream, and the EGR circuit 113 controls the EGR valve 76 to provide recirculated exhaust gases to the engine 20. In one embodiment, the SCR system 52 doses more reductant than a minimum calculated reductant dose in order to increase the ammonia storage within the SCR system 52. The dosing and recirculation continue and are controlled to maintain the NOx value below a regulation NOx threshold (e.g., as set by a state or regulatory agency, thirty grams per hour, twenty grams per hour, any predetermined value). In some embodiments, when the engine 20 is operated in the standard idle mode, the controller 100 continues to operate according to the method 200 such that the DPF circuit 106 continues to determine if the engine system 10 is operating in a regeneration mode, and so on. In some embodiments, regeneration may occur at step 206 only while the engine 20 is operating in the standard idle mode.

If the NOx circuit 108 determines that the NOx value is less than the NOx threshold value at step 214, then the fuel efficient idle mode circuit 111 communicates with the ammonia circuit 109 to compare the ammonia storage indication to an ammonia storage threshold at step 220. The ammonia storage indication may be based at least in part on amount of DEF dosed by the SCR system 52 over a set time period, and the readings of the NOx sensors 12, 14, 55, 57 over time. If the ammonia storage indication is less than or equal to the ammonia storage threshold, then the method 200 continues to step 216. If the ammonia storage indication is greater than the ammonia storage threshold, then the fuel efficient idle mode circuit 111 communicates with the fuel efficient idle timer circuit 110 and compares the time value to a fuel efficient idle time threshold at step 222. In one embodiment, the fuel efficient idle time threshold is about ten minutes. In another embodiment, the fuel efficient idle time threshold is between about ten minutes and about thirty minutes.

If the fuel efficient idle mode circuit 111 determines at step 222 that the time value is greater than or equal to the fuel efficient idle time threshold, then the method 200 continues to step 216 and the engine is operated in the standard idle mode. If the fuel efficient idle mode circuit 111 determines at step 222 that the time value is less than the fuel efficient idle time threshold, then the fuel efficient idle mode circuit 111 communicates with the engine circuit 105, the DPF circuit 106, the dosing circuit 112, and the EGR circuit 113 to operate the engine 20 in the fuel efficient idle mode at step 224. During fuel efficient idle mode, regeneration, DEF dosing, and EGR are inhibited or stopped altogether. In other words, in some embodiments, the DPF circuit 106 does not initiate regeneration, the dosing circuit 112 does not communicate to the SCR system 52 to dose reductant, and the EGR circuit 113 does not direct the opening of the EGR valve 76 when the engine 20 is operated in the fuel efficient idle mode.

In some embodiments, during operation of the engine 20 in the fuel efficient idle mode, the fuel efficient idle timer circuit 110 increments the time value at step 226, and the method 200 continues. In this way, the fuel efficient idle mode will continue until regeneration is needed, the user directs the engine to exit idle, the NOx value exceeds the NOx threshold, the ammonia storage indication drops below the ammonia storage threshold, or the time value exceeds the fuel efficient idle time threshold. Taken together, the data or sensor outputs and determined values used in the method 200 may be termed operation data.

The fuel efficient idle mode increases fuel efficiency during operation by reducing or eliminating EGR and/or reductant dosing. In some embodiments, the fuel efficient idle mode includes reducing or eliminating EGR but does not affect reductant dosing. In other embodiments, the fuel efficient idle mode reduces or eliminates reductant dosing but does not affect EGR. The reduction or elimination of EGR and/or reductant dosing increases the fuel efficiency of the engine 20 while continuing operation within the regulated emission thresholds, so that the user can reduce fuel costs while not substantially increasing environmental impact.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors, such as processor 102 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. As also alluded to above, computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer (such as via the controller 100 of FIGS. 1 and 2), partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:
    a stored reductant determination circuit structured to determine an amount of stored reductant in a selective catalytic reduction (SCR) component of an exhaust aftertreatment system;
    a fuel mode economy circuit structured to control an amount of reductant added to the exhaust aftertreatment system during a standard engine idle mode of operation based on the amount of stored reductant, wherein the fuel mode economy circuit is structured to enter a fuel efficient engine idle mode in which the fuel mode economy circuit is inhibited from adding reductant during the fuel efficient engine idle mode in response to determining that a temperature in the SCR component is above a temperature threshold and in response to determining that an amount of time that an engine is in at least one of the standard engine idle mode and the fuel efficient engine idle mode is less than a fuel efficient idle time threshold.

2. The apparatus of claim 1, wherein the fuel mode economy circuit is further structured to control the amount of reductant added based on operation data regarding exhaust gas flowing through the exhaust aftertreatment system, wherein the operation data includes an indication of an amount of nitrogen oxide exiting the exhaust aftertreatment system, wherein in response to the amount of nitrogen oxide exiting the exhaust aftertreatment system being less than a threshold, the fuel mode economy circuit is further structured to increase the amount of reductant added to the exhaust aftertreatment system.

3. The apparatus of claim 1, wherein the fuel mode economy circuit is further structured to control the amount of reductant added based on operation data regarding exhaust gas flowing through the exhaust aftertreatment system, wherein the operation data includes an indication of an amount of nitrogen oxide exiting the exhaust aftertreatment system, and wherein the reductant is urea.

4. The apparatus of claim 1, wherein the fuel mode economy circuit is structured to determine a nitrogen oxide conversion efficiency of the SCR component based on the stored urea amount and the indication of nitrogen oxide exiting the exhaust aftertreatment system.

5. The apparatus of claim 1, wherein the fuel mode economy circuit is further structured to control the amount of reductant added based on operation data regarding exhaust gas flowing through the exhaust aftertreatment system, wherein the operation data includes an indication of an amount of nitrogen oxide exiting the exhaust aftertreatment system, wherein in response to the amount of nitrogen oxide exiting the exhaust aftertreatment system exceeding a threshold, the fuel mode economy circuit is further structured to activate an existing engine idle process.

6. The apparatus of claim 1, wherein the reductant includes a first reductant and a second reductant, wherein the first reductant is urea and the second reductant is ammonia.

7. The apparatus of claim 6, wherein the stored reductant determination circuit is structured to determine an amount of stored ammonia, and wherein the fuel mode economy circuit is structured to control an amount of urea added to the exhaust aftertreatment system during the standard engine idle mode of operation based on the amount of stored ammonia.

8. The apparatus of claim 1, further including a timer circuit structured to activate and maintain activation of the fuel mode economy circuit for a predefined amount of time during the fuel efficient engine idle mode based on operation data regarding exhaust gas flowing through the exhaust aftertreatment system.

9. The apparatus of claim 8, further comprising a time comparison circuit structured to compare a time count stored in the timer circuit to the fuel efficient idle time threshold.

10. The apparatus of claim 1, wherein the fuel economy mode circuit is structured to dose more reductant than a minimum calculated reductant dose in order to increase the ammonia storage within the SCR component.

11. A system comprising:
an exhaust aftertreatment system including a reductant source and a selective catalytic reduction (SCR) component; and
a controller in communication with the exhaust aftertreatment system, the controller structured to:
determine an amount of stored reductant in the SCR component of the exhaust aftertreatment system; and
control an amount of reductant added to the exhaust aftertreatment system during a standard engine idle mode of operation based on the amount of stored reductant, wherein the fuel mode economy circuit is structured to enter a fuel efficient engine idle mode in which the fuel mode economy circuit is inhibited from adding reductant during the fuel efficient engine idle mode in response to determining that a temperature of the SCR component is above a temperature threshold and in response to determining that an amount of time that an engine is in at least one of the standard engine idle mode and the fuel efficient engine idle mode is less than a fuel efficient idle time threshold.

12. The system of claim 11, wherein the controller is further structured to control the amount of reductant added based on operation data regarding exhaust gas flowing through the exhaust aftertreatment system, wherein the operation data includes an indication of an amount of nitrogen oxide exiting the exhaust aftertreatment system, wherein in response to the amount of nitrogen oxide exiting the exhaust aftertreatment system exceeding a threshold, the controller is further structured to increase the amount of reductant added to the exhaust aftertreatment system.

13. The system of claim 11, wherein the controller is further structured to control the amount of reductant added based on operation data regarding exhaust gas flowing through the exhaust aftertreatment system, wherein the operation data includes an indication of an amount of nitrogen oxide exiting the exhaust aftertreatment system, and wherein the reductant is urea.

14. The system of claim 11, wherein the controller is structured to control the amount of reductant added to the exhaust aftertreatment system based on operation data regarding exhaust gas flowing through the exhaust aftertreatment system and the stored reductant amount for a predefined amount of time.

15. The system of claim 11, wherein the controller is structured to dose more reductant than a minimum calculated reductant dose in order to increase the ammonia storage within the SCR component.

16. A method comprising:
detecting a level of nitrogen oxide present in a flow of exhaust gas downstream of a catalyst during an engine idle mode of operation;
comparing the detected level of nitrogen oxide to a threshold;
providing, during a standard engine idle mode, reductant to the catalyst in response to determining that the nitrogen oxide level is above the threshold;
inhibiting, during a fuel efficient engine idle mode, reductant from being added during the fuel efficient engine idle mode in response to determining that a temperature of a selective catalytic reduction (SCR) component is above a temperature threshold and in response to determining that an amount of time that an engine has been in at least one of the standard engine idle mode and the fuel efficient engine idle mode is less than a fuel efficient idle time threshold.

17. The method of claim 16, further comprising determining if an ammonia level present in the catalyst is above an ammonia storage threshold.

18. The method of claim 16, wherein providing the reductant to the catalyst includes providing substantially more than a minimum calculated reductant dose.

19. The method of claim 16, further comprising timing a duration that a flow of reductant to the catalyst is inhibited, and providing reductant to the catalyst after the duration reaches a timing threshold.

20. The method of claim 16, further comprising operating an exhaust gas recirculation system when the nitrogen oxide level is above the threshold, and inhibiting operation of the exhaust gas recirculation system when the nitrogen oxide level is below the threshold.

* * * * *